United States Patent
Yoo et al.

(10) Patent No.: US 9,160,997 B2
(45) Date of Patent: Oct. 13, 2015

(54) DISPLAY APPARATUS INCLUDING A WAVELENGTH CONVERSION LAYER

(75) Inventors: Younggil Yoo, Seoul (KR);
Myeonchang Sung, Seoul (KR);
Joongnyon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 13/995,090

(22) PCT Filed: Mar. 13, 2012

(86) PCT No.: PCT/KR2012/001804
§ 371 (c)(1),
(2), (4) Date: Jun. 17, 2013

(87) PCT Pub. No.: WO2013/051771
PCT Pub. Date: Apr. 11, 2013

(65) Prior Publication Data
US 2013/0265552 A1    Oct. 10, 2013

(30) Foreign Application Priority Data
Oct. 4, 2011    (KR) .................. 10-2011-0100567

(51) Int. Cl.
*G03B 21/00*    (2006.01)
*H04N 9/31*    (2006.01)
*G03B 21/20*    (2006.01)
*F21V 9/08*    (2006.01)

(52) U.S. Cl.
CPC ................ *H04N 9/3197* (2013.01); *F21V 9/08* (2013.01); *G03B 21/204* (2013.01); *G03B 21/2013* (2013.01); *H04N 9/3158* (2013.01)

(58) Field of Classification Search
CPC ............................ H04N 9/315; H04N 9/3197
USPC ........ 353/30, 31, 37, 38, 94, 98, 99; 362/231, 362/294; 313/1, 483, 498
See application file for complete search history.

(56) References Cited

U.S. PATENT DOCUMENTS

| | | | |
|---|---|---|---|
| 6,167,648 B1* | 1/2001 | Dimmick ........................ | 40/564 |
| 2005/0270775 A1* | 12/2005 | Harbers et al. ................. | 362/231 |
| 2007/0131954 A1* | 6/2007 | Murayama et al. ............. | 257/98 |
| 2008/0001528 A1 | 1/2008 | Eida | |
| 2008/0106895 A1* | 5/2008 | Van De Ven et al. ......... | 362/231 |
| 2010/0171440 A1* | 7/2010 | Satou et al. .................... | 315/294 |
| 2011/0199580 A1* | 8/2011 | Hirata et al. .................... | 353/31 |

FOREIGN PATENT DOCUMENTS

| | | |
|---|---|---|
| JP | 2005-285800 A | 10/2005 |
| JP | 2008-10298 A | 1/2008 |
| JP | 2008-159936 A | 7/2008 |
| KR | 10-2011-0032339 A | 3/2011 |

* cited by examiner

*Primary Examiner* — Sultan Chowdhury
(74) *Attorney, Agent, or Firm* — Birch, Stewart, Kolasch & Birch, LLP

(57) ABSTRACT

A display device is disclosed. Particularly, a display device including a wavelength conversion layer is disclosed. The display device includes a first light source including a substrate, a light emitting device disposed on the substrate and emitting light having a first wavelength band, and a wavelength conversion layer disposed on the light emitting device, at least partially absorbing the light having a first wavelength band, converting the absorbed light into a second wavelength band, and including at least two phosphors emitting substantially the same color.

15 Claims, 6 Drawing Sheets

DISPLAY APPARATUS INCLUDING A WAVELENGTH CONVERSION LAYER

This application claims the benefit of Korean Patent Application No. 10-2011-0100567, filed on Oct. 4, 2011, which is hereby incorporated by reference as if fully set forth herein.

BACKGROUND OF THE INVENTION

1. Field of the Invention

The present invention relates to a display device, and more particularly, to a display device having a wavelength conversion layer.

2. Discussion of the Related Art

Display devices with large screen sizes and high image quality have become an important focus of interest. Examples of commercially available display devices with large screen sizes include direct view type liquid crystal displays (LCDs), plasma displays, projection TVs, and projectors.

Among theses, a projector includes a light source rendering red, green, and blue colors of an input image, and the projector projects light onto a screen by regulating brightness, contrast, and the like of the light source.

Thus, optical properties of the light source are an important factor in improving projector performance.

SUMMARY OF THE INVENTION

Accordingly, the present invention is directed to a display device having a wavelength conversion layer that substantially obviates one or more problems due to limitations and disadvantages of the related art.

An object of the present invention is to provide a display device including a light source capable of improving brightness, photo-conversion efficiency, and contrast.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device using a light emitting device includes a first light source, which includes a substrate, a light emitting device disposed on the substrate and emitting light having a first wavelength band, and a wavelength conversion layer disposed on the light emitting device, at least partially absorbing the light having a first wavelength band, converting the absorbed light into a second wavelength band, and including at least two phosphors emitting substantially the same color.

In another aspect of the present invention, a projector display device includes a light source unit including a first light source including a light emitting device emitting light having a first wavelength band and a wavelength conversion layer disposed on the light emitting device, at least partially absorbing the light having a first wavelength band, converting the absorbed light into a second wavelength band, and including at least two phosphors, a synthesis unit synthesizing light from the light source unit, a panel forming an image using the synthesized light, and a projector projecting the image.

According to the present invention, the light source may emit light with stable brightness and color coordinates according to current. A display device employing the light source may be efficiently driven. The amount of photons (brightness) emitted according to input energy may be significantly increased by minimizing heat generated by saturation during energy conversion using a high power light source such as a blue light emitting diode or efficiency variation caused thereby It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Exemplary embodiments of the present invention will be described in detail. However, the present invention is not restricted to the embodiments and includes variations, equivalents, and substitutions of technical configurations of the invention disclosed in the appended claims.

It will also be understood that when an element such as a layer, a region, or a substrate is referred to as being "on" another element, it can be directly on the other element, or intervening elements may also be present.

It will be understood that, although the terms first, second, etc., may be used herein to describe various elements, components, regions, layers and/or sections, these elements, components, regions, layers and/or sections should not be limited by these terms.

Figure 1:
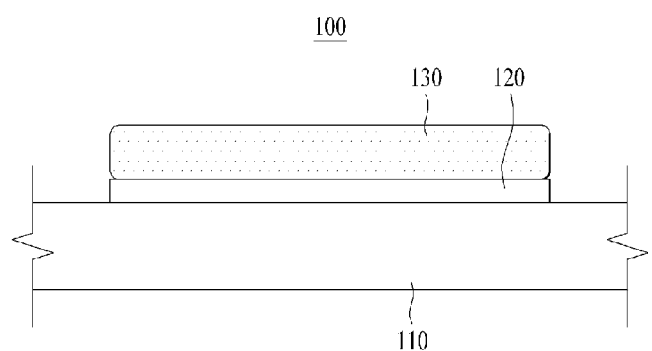
FIG. 1 is a cross-sectional view illustrating a light source using a light emitting device applicable to a display device.

FIG. 1 illustrates a light source using a light emitting device applicable to a display device. The light source 100 includes a light emitting device 120, which emits light having a first wavelength band and is disposed on a substrate 110, and a wavelength conversion layer 130, which is disposed on the light emitting device 120, at least partially absorbs the light having a first wavelength band, and converts the absorbed light into light having a second wavelength band.

The wavelength conversion layer 130 may include a phosphorescent material or a fluorescent material. Both the phosphorescent material and the fluorescent material may be referred to as phosphor (hereinafter, referred to as phosphor).

When phosphors are used in the wavelength conversion layer 130, the light source 100 may be fabricated using the wavelength conversion layer 130 including at least two phosphors.

For example, the wavelength conversion layer 130 may include two phosphors. High quality color and high brightness may be obtained using an unsaturated phosphor 131 as one of the two phosphors.

Figure 2:
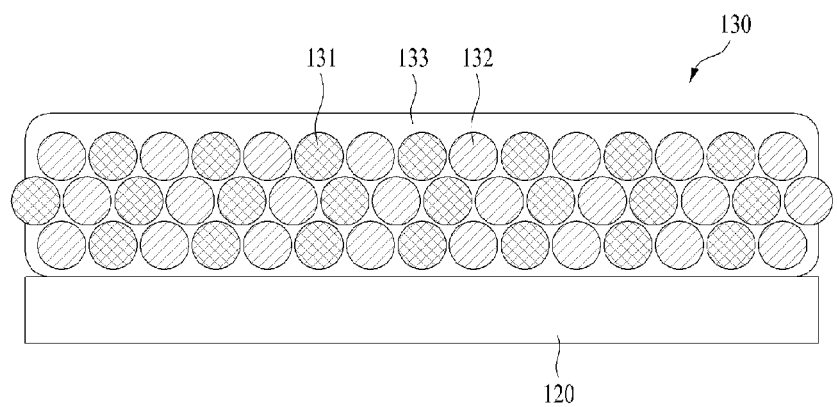
FIG. 2 is a partially enlarged view of FIG. 1.

For example, the wavelength conversion layer 130 may include an unsaturated phosphor 131 and a saturated phosphor 132 as shown in FIG. 2.

In this regard, the unsaturated phosphor 131 refers to a phosphor having efficiency maintained within a constant range depending upon driving conditions.

As shown in FIG. 2, particles of the unsaturated phosphor 131 and the saturated phosphor 132 may be contained in a transparent layer 133.

The wavelength conversion layer 130 may be a green layer emitting green light. In this regard, the wavelength conversion layer 130 absorbs light with higher energy than green light and emits green light. Accordingly, the light emitting device 120 may be a light emitting device emitting blue light, purple light, or ultraviolet light, particularly, a light emitting diode.

Here, the saturated phosphor 132 of the wavelength conversion layer 130 emitting green light may be $(Ba,Sr)_2SiO_4$:Eu, which is an orthosilicate phosphor having primary coordinates satisfying the HDTV standard, and alkaline earth metal-substituted phosphors thereof with a similar structure such as $Ba_2SiO_4$:Eu and $Sr_2SiO_4$:Eu.

However, photo-conversion efficiency of such phosphors significantly varies depending upon driving conditions. For example, the number of photons emitted from $Sr_{2-x}Ba_xSiO_4$:Eu decreases to about 90% at a brightness of 100 lm, and the decrease in the number of photons tends to be accelerated at higher current and current density (duty). That is, the number of photons decreases by about 50% at 1000 lm. Such a phosphor is referred to as a saturated phosphor 132.

Meanwhile, the unsaturated phosphor 131 is a material having a substantially constant relative luminous flux at a wider current or current density range. According to the present invention, the unsaturated phosphor 131 may be defined as a material having an efficiency variation of 10% or less at a driving current of 10 A.

More particularly, the unsaturated phosphor 131 may indicate a material exhibiting a reduction in the number of photons (brightness) emitted from the surface of a phosphor per hour or a reduction in the number of photons (brightness) emitted therefrom according to temperature change in a junction by 20% at the most under driving conditions providing a brightness of 1000 lm in comparison with driving conditions providing a brightness of 1 lm.

Examples of the unsaturated phosphor 131 include Garnet oxide phosphors, nitride phosphors, and oxynitride phosphors.

More specifically, examples of the Garnet oxide phosphor include $(Y,Lu)_3(Al,Ga)_5O_{12}$:Ce, $Lu_3Al_5O_{12}$:Ce, $Y_3Al_5O_{12}$:Ce, YAG, or lutetium aluminum garnet (LuAG).

In addition, examples of the nitride phosphor and oxynitride phosphor include $Si_{6-x}Al_xO_xN_{8-x}$:Eu (β-SiAlON).

As such, an image rendered using the light source 100 including the wavelength conversion layer 130 having the unsaturated phosphor 131 and the saturated phosphor 132 may realize optimized brightness or quality of color in a display device.

That is, the display device may achieve optimized brightness and quality of color by using the wavelength conversion layer 130 including the unsaturated phosphor 131 and the saturated phosphor 132 emitting light with substantially the same color.

In this regard, the same color is determined when a color difference between light emitted by two phosphors calculated using emission spectra based on a distance on the CIE color coordinates (x, y coordinates based on the CIE 1931 standard) is in the range of 0.25 to 0.35. That is, the color difference may be 0.35 or less, preferably 0.25.

In other words, the color difference between light emitted by the unsaturated phosphor 131 and light emitted by the saturated phosphor 132 is within the range of 0.25 to 0.35.

The CIE 1931, which is a standard colorimetric system created by the International Commission on Illumination (CIE) in 1931, is a colorimetric system based on CIE(L*a*b) uniform color space, which is a uniform colorimetry and chromaticity system. Generally, CIE 1931 is referred to as the XYZ colorimetric system, and a standard chromaticity diagram obtained by this system is referred to as a CIE 1931(x, y) chromaticity diagram.

As such, in consideration that different phosphors exhibit different photo-conversion efficiencies according to input photons or energy, brightness may be maximized using two phosphors having different efficiencies at a reference current.

As described above, in order to maximize brightness, phosphors may be mixed such that efficiency is maximized while satisfying reference color coordinates, for example, (0.300, 0.600) based on CIE 1931 standard for Advanced Television Systems Committee (ATSC). That is, color may be designed under such optimized conditions when a display is implemented.

For example, β-SiAlON and other unsaturated phosphors exhibit maximum brightness at a long wavelength of 530 nm, and thus they emit light at a region where a CIE x-coordinate value is greater than 0.33. In this case, the emission cannot satisfy the HDTV standard (ATSC standard: x<0.3 and y>0.6). Accordingly, emission may satisfy specifications of the ATSC standard (x<0.3) by mixing β-SiAlON with a saturated phosphor, e.g., $(Ba,Sr)_2SiO_4$:Eu, since the x-coordinate value of the saturated phosphor is 0.27 or less.

As such, the light source may emit light with stable brightness and color coordinates according to current. The display device employing the light source may be efficiently driven. The amount of photons (brightness) emitted according to input energy may be significantly increased by minimizing heat generated by saturation during energy conversion using a high power light source such as a blue light emitting diode or efficiency variation caused thereby.

Figure 3:
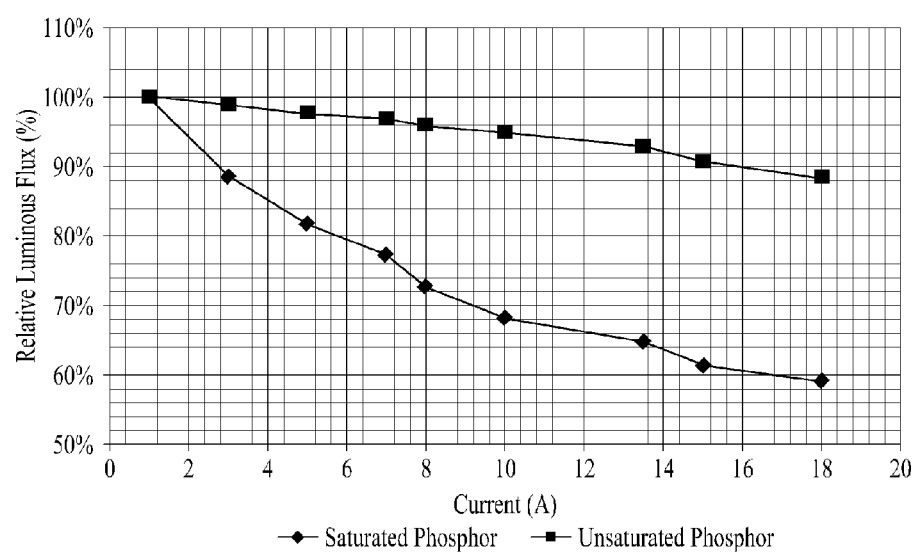
FIG. 3 is a graph illustrating relative luminous flux of a saturated phosphor and an unsaturated phosphor with respect to current.

FIG. 3 illustrates relative luminous flux of a saturated phosphor and an unsaturated phosphor with respect to current. While the relative luminous flux of the saturated phosphor significantly decreases as current increases, the relative luminous flux of the unsaturated phosphor decreases by about 10%. Accordingly, it can be seen that variation of the relative luminous flux of the unsaturated phosphor with respect to current is insignificant.

In this graph, the saturated phosphor is silicate $((Ba,Sr)_2SiO_4$:Eu$)$, and the unsaturated phosphor is $Lu_3Al_5O_{12}$:Ce referred to as LuAG.

Figure 4:
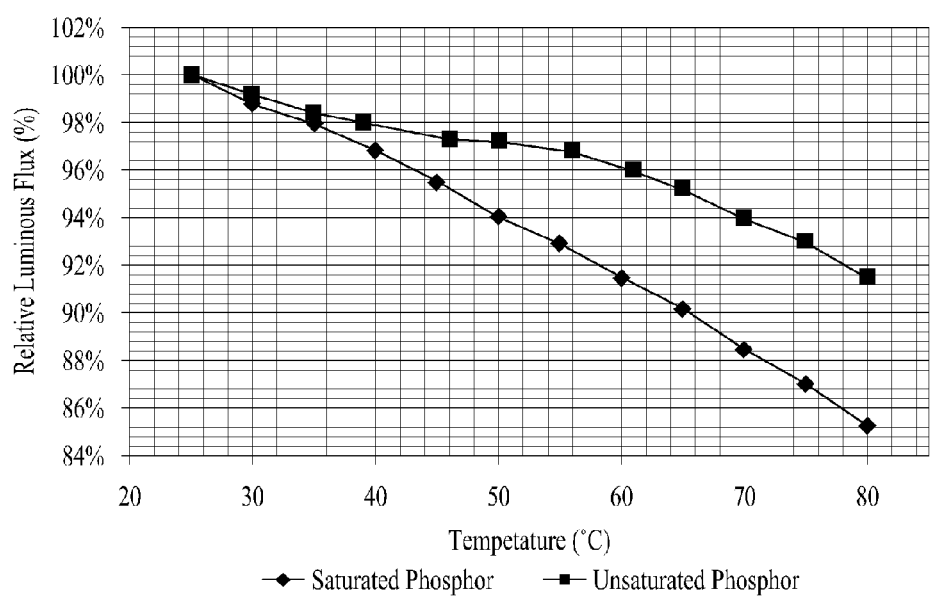
FIG. 4 is a graph illustrating relative luminous flux of a saturated phosphor and an unsaturated phosphor with respect to temperature.

In addition, FIG. 4 illustrates relative luminous flux of a saturated phosphor and an unsaturated phosphor with respect to temperature. In the same manner, variation of the relative luminous flux of the unsaturated phosphor with respect to temperature is relatively insignificant. Here, the same materials described with reference to FIG. 3 were used.

Figure 5:
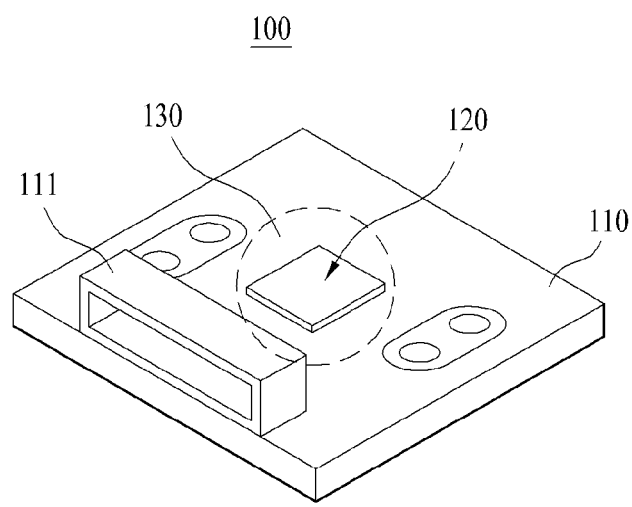
FIG. 5 is a perspective view illustrating a light source for a projector.

FIG. 5 illustrates a light source 100 of a projector as the light source 100 including the light emitting device 120 and the wavelength conversion layer 130. Hereinafter, a green light source emitting green light will be described as an example of the light source 100.

The light source 100 includes the light emitting device 120 mounted on a substrate 110 for emitting light with suitable brightness and the wavelength conversion layer 130 disposed on the light emitting device 120 and including an unsaturated phosphor and a saturated phosphor as described above.

Here, a connector 111 to which a connection line is connected to receive current may be formed on the substrate 110.

Figure 6:
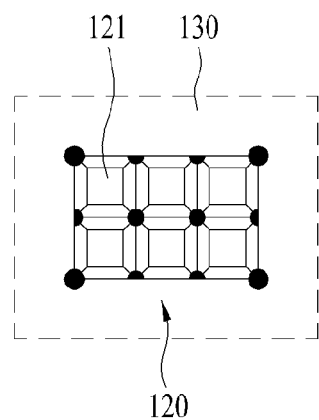
FIG. 6 is a partially enlarged view of FIG. 5.

As shown in FIG. 6, the light emitting device 120 may include a plurality of blue light emitting devices 121 connected to each other and aligned to emit light with suitable brightness, and the wavelength conversion layer 130 capable of emitting green light may be disposed on the blue light emitting devices 121.

Figure 7:
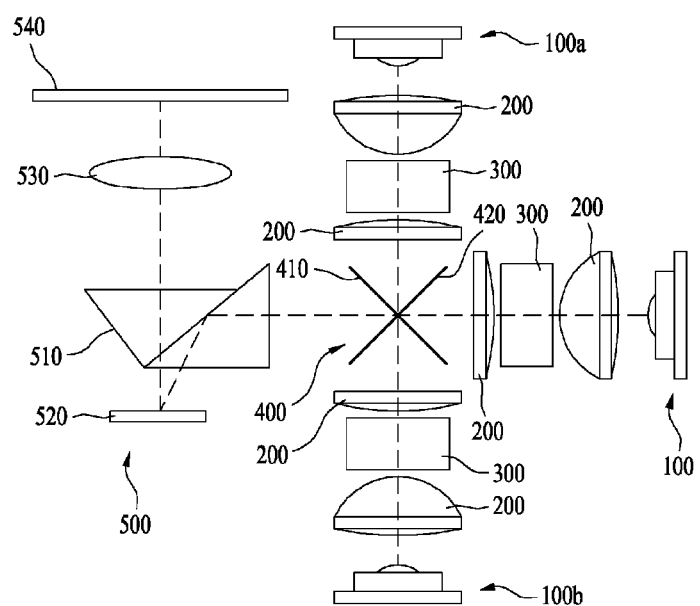
FIG. 7 is a schematic view illustrating a projector using the light source of FIG. 5.

A projector system as shown in FIG. 7 may be configured using the light source 100.

That is, the projector system includes a green light source 100, a blue light source 100a, and a red light source 100b, and each of the green, blue, and red light sources 100, 100a, and 100b includes a lighting lens 200 and a collimated light conversion unit 300, such that light beams from the green, blue, and red light sources 100, 100a, and 100b are synthesized in a synthesis unit 400.

In this regard, the red light source 100b may also be implemented using the blue light emitting device, for example, a blue light emitting diode, and a red wavelength conversion layer in the same manner as the green light source 100 as described above.

In addition, the red wavelength conversion layer for the red light source 100b may include a saturated phosphor and an unsaturated phosphor.

The synthesis unit 400 may include two dichroic mirrors 410 and 420, i.e., a first dichroic mirror 410 transmitting blue and green light and reflecting red light and a second dichroic mirror 420 reflecting blue light and transmitting green and red light.

These two dichroic mirrors 410 and 420 may be disposed to intersect each other as shown in FIG. 7 or to be parallel to each other.

As such, light synthesized in the synthesis unit 400 proceeds toward a projector 500. The light passes through a prism 510 and is incident upon a panel 520 to form an image.

An image thus formed is enlarged while passing through the prism 510 and a projection lens 530 to form an image on a screen 540.

Examples of the panel 520 on which an image is formed include a digital micromirror device (DMD), a liquid crystal on silicon (LCoS), and a liquid crystal device (LCD). The panel 520 may be a micro-switching device.

Figure 8:
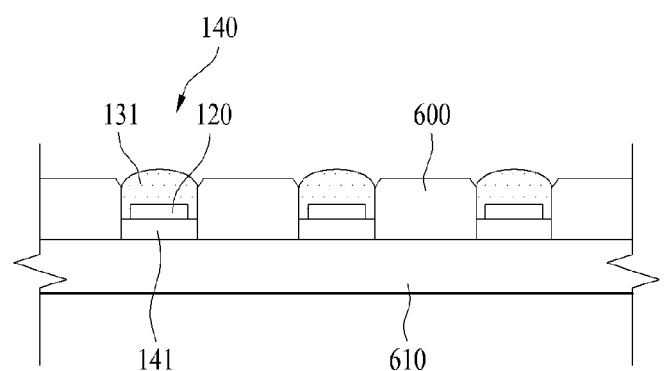
FIG. 8 is a cross-sectional view illustrating one example of sign boards.
Figure 9:
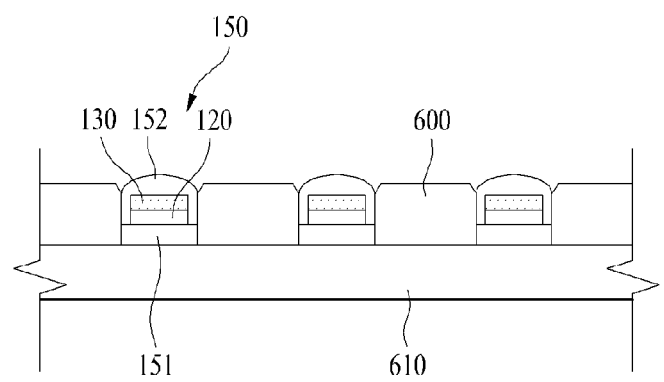
FIG. 9 is a cross-sectional view illustrating another example of sign boards.

FIGS. 8 and 9 illustrate examples of sign boards including light emitting devices using the light source 100 described above.

As shown in FIG. 8, a plurality of light emitting device packages 140, each including a light emitting device 120, are aligned on a printed circuit board 610 constituting a sign board, and a spacer 600 may be disposed between the light emitting device packages 140. The spacer 600 may improve visibility of light emitted by the light emitting device packages 140.

The light emitting device package 140 includes the light emitting device 120 mounted on a base substrate 141 and a wavelength conversion layer 131 disposed on the light emitting device 120. The wavelength conversion layer 131 may be formed by adding a phosphor to a resin. In addition, the shape of the resin may be determined to function as a lens.

In this regard, the wavelength conversion layer 131 may have characteristics as described above.

The light emitting device package 140 may be fabricated by aligning a monochromatic light emitting device package 140. If required, colors may be rendered by including blue, green, and red light emitting device packages.

That is, when the green light emitting device package is used, characteristics of the light source 100 as described above may be obtained. The red light emitting device package may also be implemented by using a blue light emitting device, for example, a blue light emitting diode, and a red wavelength conversion layer in the same manner as the green light source 100 as described above.

In addition, the red wavelength conversion layer for the red light emitting package may include a saturated phosphor and an unsaturated phosphor.

Meanwhile, as shown in FIG. 9, a light emitting device package 150 includes a light emitting device 120 mounted on a base substrate 151 and a wavelength conversion layer 130 disposed on the light emitting device 120 and having a predetermined thickness as shown in FIG. 1.

An encapsulation layer 152 may be disposed on the light emitting device 120 and the wavelength conversion layer 130 to cover the light emitting device 120 and the wavelength conversion layer 130. The encapsulation layer 152 may be formed to function as a lens as well.

These sign boards may implement a display displaying a variety of images or texts depending upon driving.

Other components not described here are the same as those described above.

As is apparent from the above description, the amount of photons (brightness) emitted according to input energy may be significantly increased by minimizing heat generated by saturation during energy conversion using a high power light source such as a blue light emitting diode or efficiency variation caused thereby. When the light source is applied to a display device such as a projector or a sign board, the light source has stable brightness and color coordinates according to current, so that the display device may be efficiently driven.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device using a light emitting device, comprising:
   a first light source comprising:
   a substrate;
   the light emitting device disposed on the substrate and emitting light having a first wavelength band; and
   a wavelength conversion layer disposed on the light emitting device, at least partially absorbing the light having the first wavelength band, converting the absorbed light into a second wavelength band, and comprising at least two phosphors including an unsaturated phosphor and a saturated phosphor that emit substantially the same color, wherein relative luminous flux of the unsaturated phosphor varies by 10% or less at a current of 10 A for driving the light emitting device.

2. The display device according to claim 1, wherein the unsaturated phosphor comprises one phosphor selected from the group consisting of Garnet oxide phosphors, nitride phosphors, and oxynitride phosphors.

3. The display device according to claim 1, wherein the saturated phosphor comprises an orthosilicate phosphor.

4. The display device according to claim 1, wherein the substantially the same color is determined when a color difference between light emitted by two phosphors calculated using emission spectra based on a distance on the CIE color coordinates is in the range of 0.25 to 0.35.

5. The display device according to claim 1, wherein the light having a first wavelength band is blue light.

6. The display device according to claim 1, wherein the second wavelength band corresponds to a wavelength band of green light.

7. The display device according to claim 1, further comprising:
  a light synthesis unit synthesizing light from the first light source, light from the second light source, and light from the third light source;
  a panel forming an image using the synthesized light; and
  a projector projecting the image.

8. The display device according to claim 1, wherein the substrate is a printed circuit board for a sign board.

9. A projector display device comprising:
  a light source unit comprising a first light source comprising a light emitting device emitting light having a first wavelength band and a wavelength conversion layer disposed on the light emitting device, at least partially absorbing the light having a first wavelength band, converting the absorbed light into a second wavelength band, and comprising at least two phosphors including an unsaturated phosphor and a saturated phosphor;
  a synthesis unit synthesizing light from the light source unit;
  a panel forming an image using the synthesized light; and
  a projector projecting the image,
  wherein relative luminous flux of the unsaturated phosphor varies by 10% or less at a current of 10 A for driving the light emitting device.

10. The projector display device according to claim 9, wherein the unsaturated phosphor comprises one phosphor selected from the group consisting of Garnet oxide phosphors, nitride phosphors, and oxynitride phosphors.

11. The projector display device according to claim 9, wherein the saturated phosphor comprises an orthosilicate phosphor.

12. The projector display device according to claim 9, wherein the at least two phosphors emit light having substantially the same color.

13. The projector display device according to claim 12, wherein the substantially the same color is determined when a color difference between light emitted by two phosphors calculated using emission spectra based on a distance on the CIE color coordinates is in the range of 0.25 to 0.35.

14. The projector display device according to claim 9, wherein the light having a first wavelength band is blue light and the second wavelength band corresponds to a wavelength band of green light.

15. The projector display device according to claim 14, wherein the wavelength conversion layer at least partially absorbs the light having a first wavelength band, converting the absorbed light into a third wavelength band.

* * * * *